United States Patent [19]
Odell

[11] Patent Number: 5,265,323
[45] Date of Patent: Nov. 30, 1993

[54] METHOD OF FABRICATING A STATOR ASSEMBLY FOR A NON-STATIC COGGING BRUSHLESS DC MOTOR

[75] Inventor: Daniel M. C. Odell, Aiken, S.C.

[73] Assignee: E. I. Du Pont de Nemours and Company, Wilmington, Del.

[21] Appl. No.: 935,668

[22] Filed: Aug. 25, 1992

Related U.S. Application Data

[60] Continuation of Ser. No. 430,140, Nov. 1, 1989, abandoned, which is a division of Ser. No. 317,213, Feb. 28, 1989, Pat. No. 5,013,953.

[51] Int. Cl.$^5$ .................................. H02K 15/06
[52] U.S. Cl. .................................. 29/596; 29/598; 310/42; 310/174
[58] Field of Search .................. 29/596, 598, 606; 310/254, 42, 194

[56] References Cited

U.S. PATENT DOCUMENTS

| | | | |
|---|---|---|---|
| 2,607,816 | 8/1952 | Ryder et al. | 29/596 |
| 2,695,969 | 11/1954 | Yates | 29/598 |
| 3,652,884 | 3/1972 | Vuffray | 310/156 |
| 3,747,320 | 7/1973 | Vuffray | 58/23 |
| 3,932,929 | 1/1976 | Hallerback | 29/596 |
| 4,311,933 | 1/1982 | Riggs | 310/156 |
| 4,321,494 | 3/1982 | MacNab | 310/179 |
| 4,556,811 | 12/1985 | Hendricks | 310/266 |
| 4,563,808 | 1/1986 | Lender | 29/596 |
| 4,679,313 | 7/1987 | Schultz et al. | 29/596 |
| 4,687,977 | 8/1987 | Brahmavar | 310/492 |
| 4,709,180 | 11/1987 | Denk | 310/179 |
| 4,818,905 | 4/1989 | Lender | 310/42 |
| 4,852,245 | 8/1989 | Denk | 29/596 |
| 4,868,970 | 9/1989 | Schultz et al. | 29/596 |
| 4,954,739 | 9/1990 | Schultz et al. | 310/156 |
| 4,968,911 | 11/1990 | Denk | 310/42 |

FOREIGN PATENT DOCUMENTS

| | | |
|---|---|---|
| 0193929 | 9/1986 | European Pat. Off. |
| 2165678 | 7/1973 | Fed. Rep. of Germany |
| 2165785 | 7/1973 | Fed. Rep. of Germany |
| 1344021 | 10/1963 | France |
| 2064298 | 7/1971 | France |

Primary Examiner—Carl E. Hall

[57] ABSTRACT

A stator assembly for a non-static cogging brushless DC motor includes a hollow coil forming member fabricated on a nonconductive and nonmagnetic material having an array of generally radially extending teeth. Each tooth has a pair of generally radially extending sidewalls that extend substantially the entire axial length of the coil forming member. A plurality of coils is wound on the teeth of the coil forming member so that the coils are disposed in surrounding relationship with respect to the radially extending sidewalls of the teeth. The teeth on the coil forming member may extend either radially inwardly or radially outwardly thereof.

6 Claims, 4 Drawing Sheets

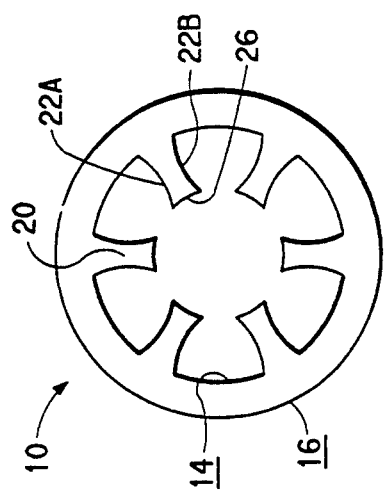
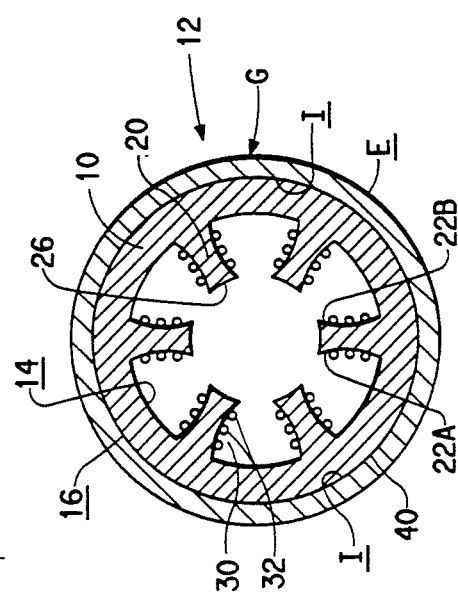

5,265,323

METHOD OF FABRICATING A STATOR ASSEMBLY FOR A NON-STATIC COGGING BRUSHLESS DC MOTOR

This is a continuation of application Ser. No. 07/430,140 filed Nov. 1, 1989, now abandoned, which is a division of application Ser. No. 07/317,213, filed Feb. 28, 1989, now U.S. Pat. No. 5,013,953.

FIELD OF THE INVENTION

The present invention relates, in general, to a brushless DC motor and in particular to a brushless DC motor having a stator assembly with a nonconductive and nonmagnetic coil forming member and to a method for fabricating a stator assembly for a brushless DC motor having the same.

DESCRIPTION OF THE PRIOR ART

With reference to FIGS. 1 and 2 shown are, respectively, an isometric view of a stator member M and an end elevational view (partly in section) of a stator assembly S including the stator member M, for a brushless DC motor. The stator member M is a generally cylindrical member having a plurality of generally radially inwardly extending teeth T. The teeth T have generally radially inwardly extending sidewalls W that extend axially along the length of the stator member M. The stator member M is typically formed from joined plural ferromagnetic lamellae L. Stator coils C (FIG. 2) are wound around the teeth T in abutting relationship to the sidewalls W of the teeth T to form the stator assembly S. The teeth T accurately position the coils C on the interior of the stator member M.

To form a brushless DC motor, a rotor R shown in dot-dash lines in FIG. 2 having permanent magnets P thereon is inserted into the stator assembly S. Application of a DC voltage to the coils C in accordance with a predetermined pattern as governed by a suitable switching matrix causes the rotor R to rotate within the stator assembly S.

In a brushless DC motor having a stator assembly S as shown in FIG. 2, a phenomenon known as "static cogging" can occur. This phenomenon should not be confused with the term "cogging" as applied to the normal torque ripple inherent in a brushless DC motor. "Static cogging" is the abrupt shifting of the rotor R during very low speed operation caused by the preferential attraction of the magnets P on the rotor R to the most proximal one of the ferromagnetic teeth T of the stator assembly S. U.S. Pat. No. 4,687,977 (Brahmavar) discloses a brushless DC motor that appears susceptible to static cogging. If such a motor is used in a centrifuge instrument intended for the separation of gradients, static cogging can be deleterious in that it can result in remixing of separated fractions of the gradient.

Static cogging can be avoided if the coils of the motor are located on a generally smooth interior walled stator member. U.S. Pat. No. 4,563,808 (Lender) discloses two alternate methods for winding the stator coils on such a smooth interior walled stator member. Shown in FIGS. 3 and 4 are respectively an isometric and an end elevational view of a prior art support member G for a stator assembly S for a non-static cogging brushless DC motor. The stator support member G is a generally elongated cylindrical member formed of a plurality ferromagnetic lamellae L. The stator support member G is generally hollow and has an exterior surface E and an interior surface I. The interior surface I defines a bore having a predetermined interior dimension $D_I$. The exterior surface E of the member G defines a predetermined exterior dimension $D_E$. Both the exterior surface E and the interior surface I of the support member G are smooth.

Both methods disclosed in the above-referenced Lender patent utilize temporary supports on which the coils are wound. The advantage of such a technique is that the winding of the coils is accomplished using conventional winding machines. However, this method is believed to be disadvantageous because the expansion of a split cylindrical member used to compress the stator coil radially against the inside wall of the stator member is believed to cause the position of the coils to shift.

U.S. Pat. No. 4,556,811 (Hendricks) discloses a coil form for a stator assembly for a brushless DC motor that accurately positions the stator coils. The stator coils are wound so as to surround the interior and exterior walls of the cylindrical coil form. However, such a coil form is believed disadvantageous because coils cannot be wound on it using conventional winding machines.

U.S. Pat. No. 3,932,929 (Hallerback et al.) and U.S. Pat. No. 4,321,494 (MacNab) both disclose stator members for brushless DC motors. The form of the stator in each of these patents appears to preclude the winding of the coils using conventional winding machines.

Accordingly, in view of the foregoing it is believed advantageous to provide a stator assembly for a non-static cogging brushless DC motor and a method of fabricating the same that accurately and reproducibly positions the stator coils without compromising the use of a conventional winding apparatus.

SUMMARY OF THE INVENTION

The present invention relates to a stator assembly for a non-static cogging brushless DC motor and a method of manufacturing the same. The stator assembly includes a hollow coil forming member mounted on a support member. The coil forming member is fabricated of a nonconductive and nonmagnetic material and has an array of generally radially extending teeth. Each tooth has a pair of generally radially extending sidewalls that extend substantially the entire axial length of the coil forming member. A plurality of coils is wound on the teeth of the coil forming member so that the coils are disposed in surrounding relationship with respect to the radially extending sidewalls of the teeth. The teeth on the coil forming member may extend either radially inwardly or radially outwardly thereof.

BRIEF DESCRIPTION OF THE DRAWINGS

The invention will be more fully understood from the following detailed description thereof, taken in connection with the accompanying drawings which form a part of this application and in which:

FIGS. 5 and 6 are respectively an isometric and an end elevational view of a first embodiment of a coil forming member in accordance with the present invention;

FIG. 7 is a sectional view of a stator assembly for a non-static cogging brushless DC motor in accordance with the present invention having a coil forming member shown in FIGS. 5 and 6;

DETAILED DESCRIPTION OF THE INVENTION

Figure 1:
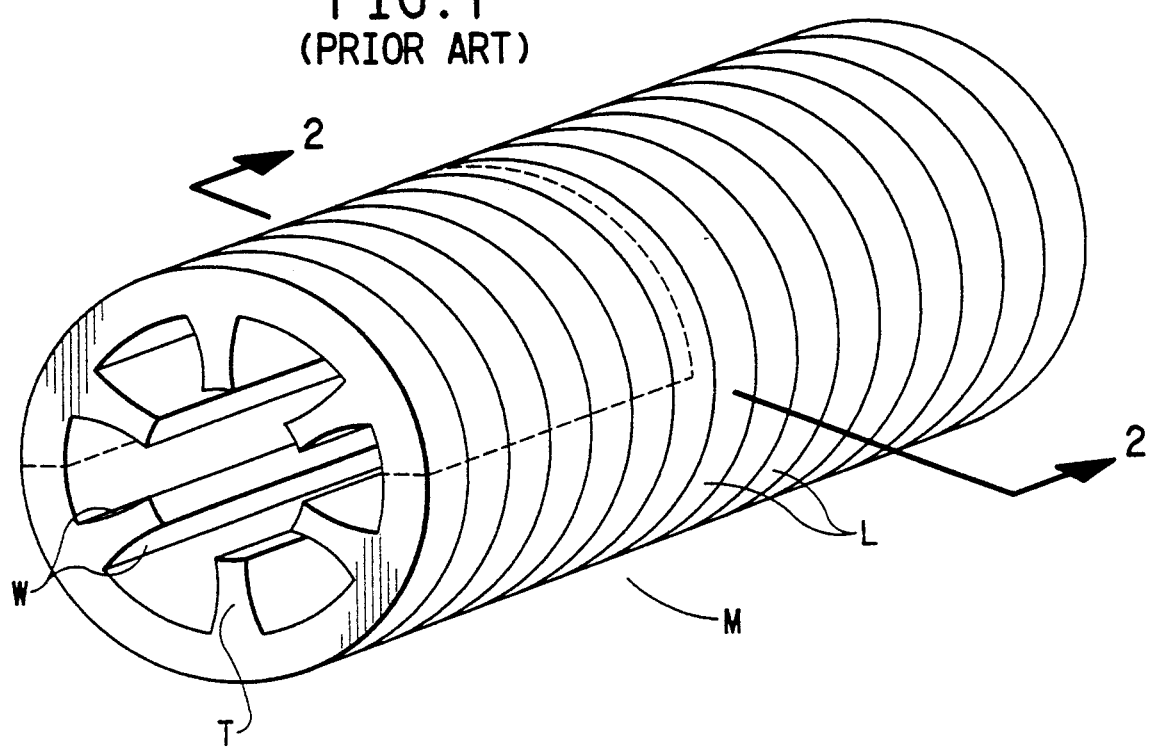
FIG. 1 is an isometric view of a stator member for a brushless DC motor of the prior art.
Figure 2:
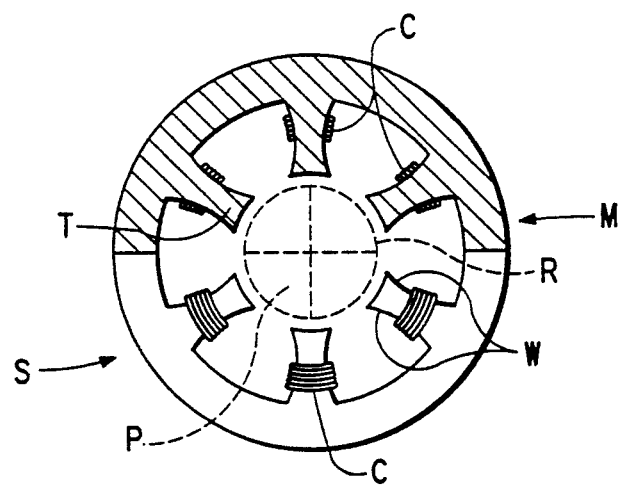
FIG. 2 is an end elevational view of a stator assembly using the stator member of FIG. 1, the view of FIG. 2 being taken along view lines 2—2 in FIG. 1 and having the segment indicated by dotted lines in FIG. 1 removed.

Throughout the following detailed description similar reference numerals refer to similar elements in all figures of the drawings.

Figure 3:
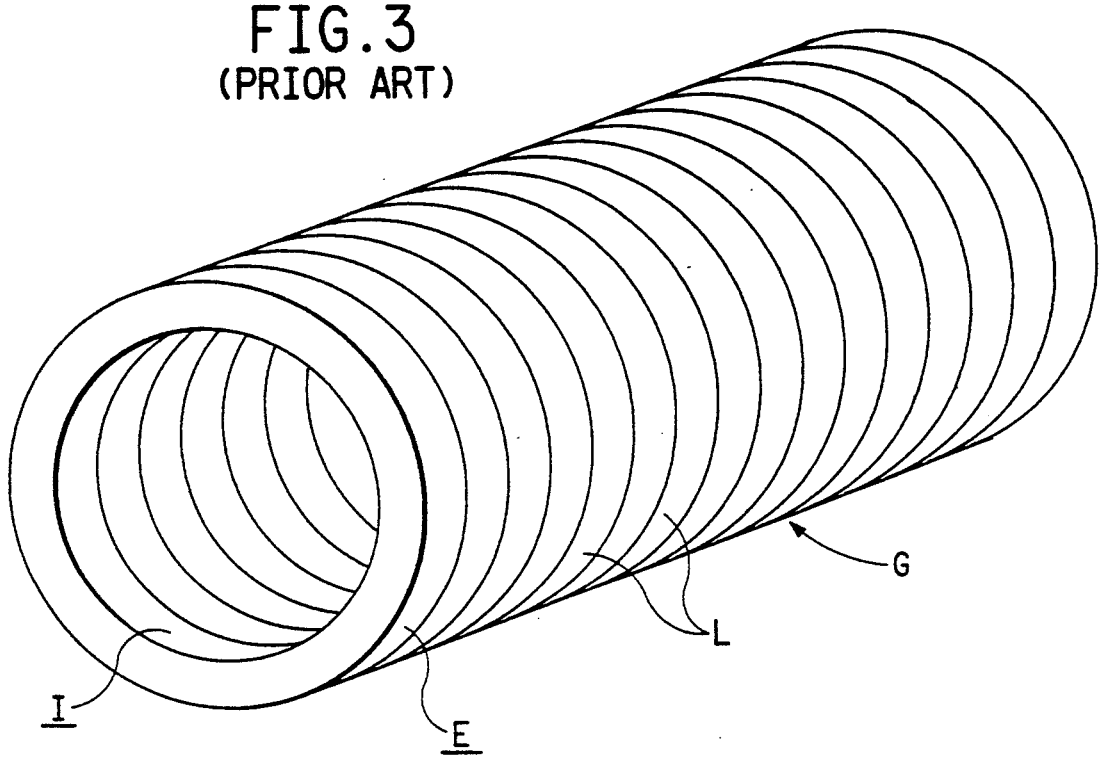
FIGS. 3 and 4 are respectively an isometric and an end elevational view of a prior art support member for a stator for a brushless DC motor.
Figure 4:
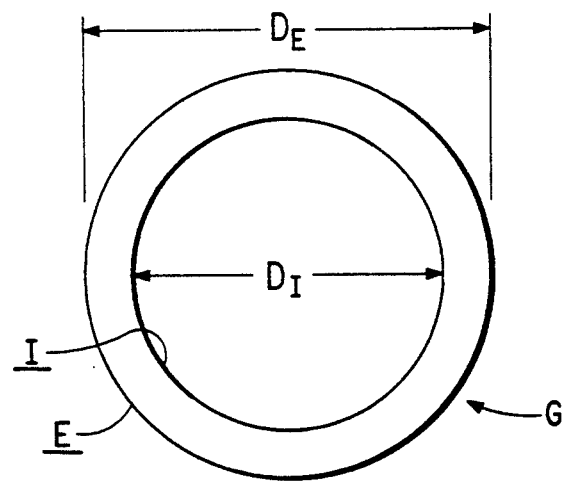

FIGS. 5 and 6 are respectively an isometric and an end elevational view of a first embodiment of a coil forming member 10 used to form a stator assembly 12 as shown in FIG. 7. In the stator assembly 12 shown in FIG. 7 the coil forming member 10 is mounted to the interior surface I of the support member G (FIGS. 3 and 4). The support member G defines the structural member on which is mounted the coil forming member 10 to form the stator assembly 12 in accordance with the present invention.

The coil forming member 10 is a hollow, generally cylindrical member having an interior surface 14 and an exterior surface 16. The exterior surface 16 is smooth and has a predetermined diametrical dimension 18 that is substantially equal to the interior dimension $D_I$ of the support member G. The coil forming member 10 is fabricated of a nonconductive and nonmagnetic material. Preferably the material used to form the coil forming member 10 is a polymeric composition such as a urethane epoxy compound. The member 10 may be fabricated in any convenient fashion, as by injection molding or machining.

In the embodiment of the coil forming member 10 shown in FIGS. 6 and 7 an array of generally radially extending teeth 20 is provided on the interior surface 14. Each tooth 20 has a pair of generally radially extending sidewalls 22A, 22B. The sidewalls 22A, 22B extend substantially the entire axial length 24 of the coil forming member 10. Each of the teeth 20 terminates in a generally circumferentially extending tip surface 26.

A coil 30, comprising a plurality of turns 32 of an electrical conductor, is wound on the teeth 20 of the coil forming member 10. Each of the plurality of turns 32, and thus the coil 30 so formed, is disposed in surrounding relationship with respect to the radially extending sidewalls 22A, 22B of a tooth 20. The coils 30 are wound using a standard coil winding apparatus. U.S. Pat. No. 4,563,808 (Lender) identifies a coil winding apparatus.

In FIG. 7 the stator assembly 12 includes the coil forming member 10 mounted on the interior surface I of the support member G. It is there held by a layer 40 of an adhesive such as a two part urethane adhesive compound. It should also be understood that in accordance with the present invention the coils 30 may be wound prior to insertion of the coil forming member 10 into the support G. Alternatively the coil forming member 10 may be introduced into the support G and the resulting element thereafter inserted into a winding apparatus and the coils 30 then wound thereon. It should also be appreciated that the coil forming member 10 may be alternatively mounted to the support member G by insert injection molding the coil forming member to the support member using the support member as the insert. In this event the coils are wound after the forming member is mounted to the support member.

Figure 9:
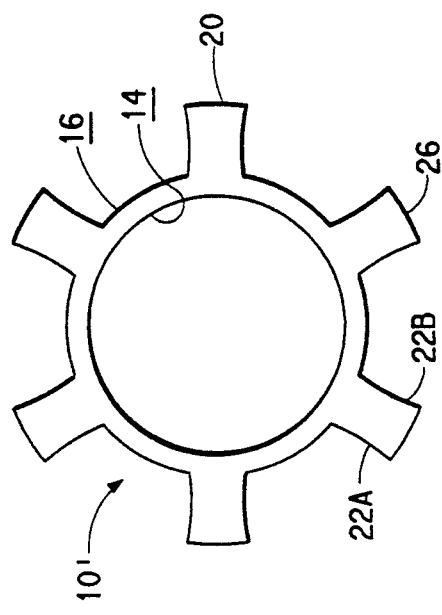
FIGS. 8 and 9 are respectively an isometric and an end elevational view of an alternate embodiment of the coil forming member in accordance with the present invention.
Figure 10:
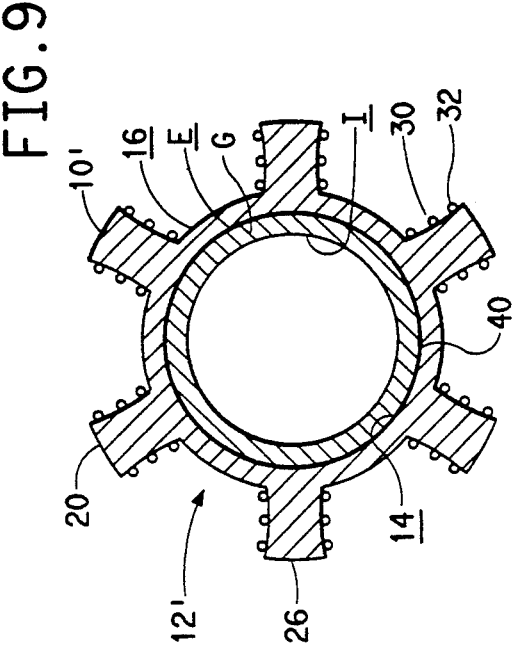
FIG. 10 is a sectional view of a stator assembly for a non-static cogging brushless DC motor in accordance with the present invention having a coil forming member shown in FIGS. 8 and 9.
Figure 8:
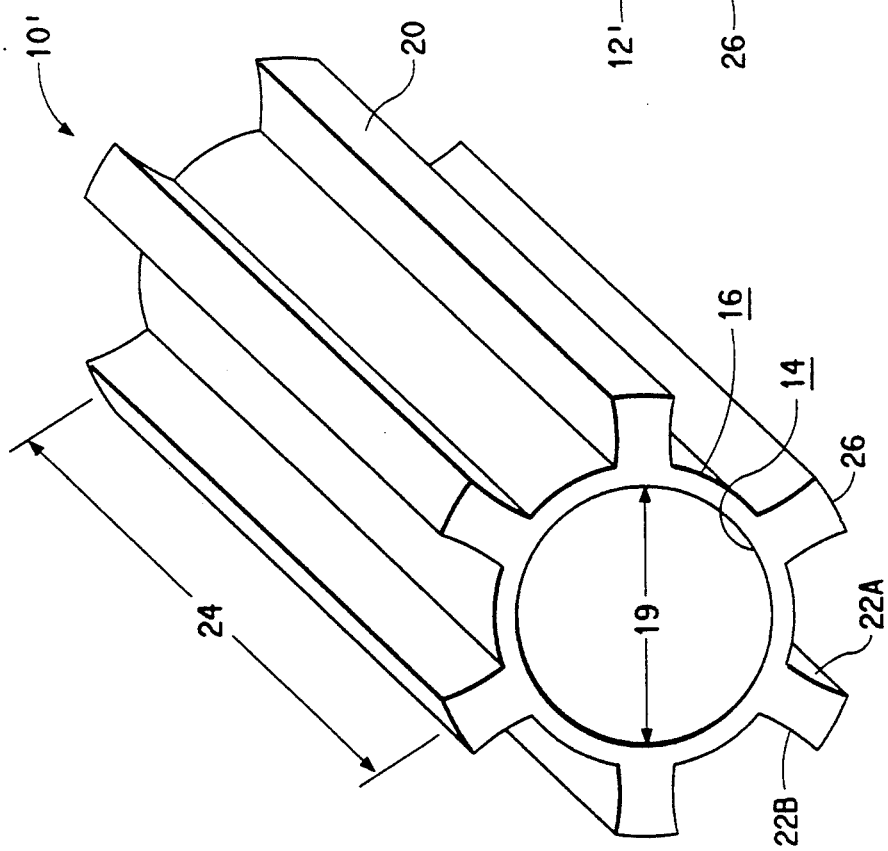

FIGS. 8 and 9 respectively illustrate an isometric and an end elevational view of an alternate embodiment of the coil forming member 10' in accordance with the present invention. FIG. 10 shows a stator assembly 12' in which the coil forming member 10' is mounted to the exterior surface E of the support member G.

The coil forming member 10' differs from the member 10 (FIGS. 5 and 6) in that the interior surface 14 is smooth while the teeth 20 extend radially outwardly from the outer surface 16 thereof. The interior dimension 19 of the coil forming member 10' is generally equal to the exterior dimension $D_E$ of the support member G so that the coil forming member 10' may be mounted (in either manner discussed above) to the exterior of the member G to form the stator assembly 12' shown in FIG. 10. As discussed above the coils 30 may be wound either prior to or subsequent to the mounting of the member 10' on the support G.

Using the coil forming member 10 or 10' in accordance with the present invention results in a stator assembly 12 or 12', respectively, in which the coils 30 are able to be reproducibly and accurately equiangularly spaced with respect to each other. Thus, in operation, a non-static cogging brushless DC motor having a stator assembly 12 or 12' in accordance with the present invention will be more efficient and exhibit less variation in torque response than a prior art non-static cogging brushless DC motor.

Those skilled in the art, having the benefit of the teachings of the present invention may impart numerous modifications thereto. These modifications are to be construed as lying within the scope of the present invention as defined by the appended claims.

What is claimed:

1. A method of fabricating a stator assembly for a brushless DC motor comprising the steps of:
    first winding an electrical conductor on a hollow coil forming member having an array of generally radially extending teeth,
    each tooth having a pair of generally radially extending sidewalls that extend substantially the entire axial length of the coil forming member such that the conductor takes the form of a coil having a plurality of turns with the turns being disposed in surrounding relationship with respect to the radially extending sidewalls of the teeth,
    the hollow coil forming member having an interior surface and an exterior surface thereon, one of the interior or exterior surfaces being smooth, the coil forming member, including the teeth thereof, being fabricated of a nonconductive and nonmagnetic material; and
    thereafter mounting the coil forming having the coil thereon on a support member with the smooth surface of the coil forming being positioned on the support member.

2. The method of claim 1 wherein the support member has an exterior surface thereon and wherein the interior surface of the coil forming member is the smooth surface, the coil forming member being mounted with the smooth interior surface thereof on the exterior surface of the support member.

3. The method of claim 1 wherein the support member is generally hollow and has an interior surface thereon and wherein the exterior surface of the coil forming member is the smooth surface, the coil forming member being mounted with the smooth interior surface thereof on the interior surface of the support member.

4. A method of fabricating a stator assembly for a brushless DC motor comprising the steps of:

first mounting to a support member a coil forming member having an array of generally radially extending teeth, each tooth having a pair of generally radially extending sidewalls that extend substantially the entire axial length of the coil forming member, the hollow coil forming member having an interior surface and an exterior surface thereon, one of the interior or exterior surfaces being smooth, the coil forming member, including the teeth thereof, being fabricated of a nonconductive and nonmagnetic material, the smooth surface of the coil forming being positioned on the support member; and thereafter winding an electrical conductor on the coil forming member such that the conductor takes the form of a coil having a plurality of turns with the turns being disposed in surrounding relationship with respect to the radially extending sidewalls of the teeth.

5. The method of claim 4 wherein the support member has an exterior surface thereon and wherein the interior surface of the coil forming member is the smooth surface, the coil forming member being mounted with the smooth interior surface thereof on the exterior surface of the support member.

6. The method of claim 4 wherein the support member is generally hollow and has an interior surface thereon and wherein the exterior surface of the coil forming member is the smooth surface, the coil forming member being mounted with the smooth interior surface thereof on the interior surface of the support member.

* * * * *

UNITED STATES PATENT AND TRADEMARK OFFICE
CERTIFICATE OF CORRECTION

PATENT NO. : 5,265,323
DATED : November 30, 1993
INVENTOR(S) : Daniel M. C. Odell It is certified that error appears in the above—identified patent and that said Letters Patent is hereby corrected as shown below:

On title page, item [60], line 2, delete "317,213" and insert -- 317,231 --.

Column 1, line 8, delete "07/317,213" and insert -- 07/317,231 --.

Signed and Sealed this

Seventeenth Day of September, 1996

Attest:

BRUCE LEHMAN

Attesting Officer     Commissioner of Patents and Trademarks